July 11, 1950  R. B. ISEMAN  2,514,395
TILLING IMPLEMENT WITH CONCENTRIC HELICAL CUTTERS
Filed Oct. 19, 1946  5 Sheets-Sheet 1

INVENTOR
Richard B. Iseman
BY William B. Jaspert
ATTORNEY

July 11, 1950   R. B. ISEMAN   2,514,395
TILLING IMPLEMENT WITH CONCENTRIC HELICAL CUTTERS
Filed Oct. 19, 1946   5 Sheets-Sheet 3

INVENTOR
Richard B. Iseman
by
William B. Jaspert
ATTORNEY

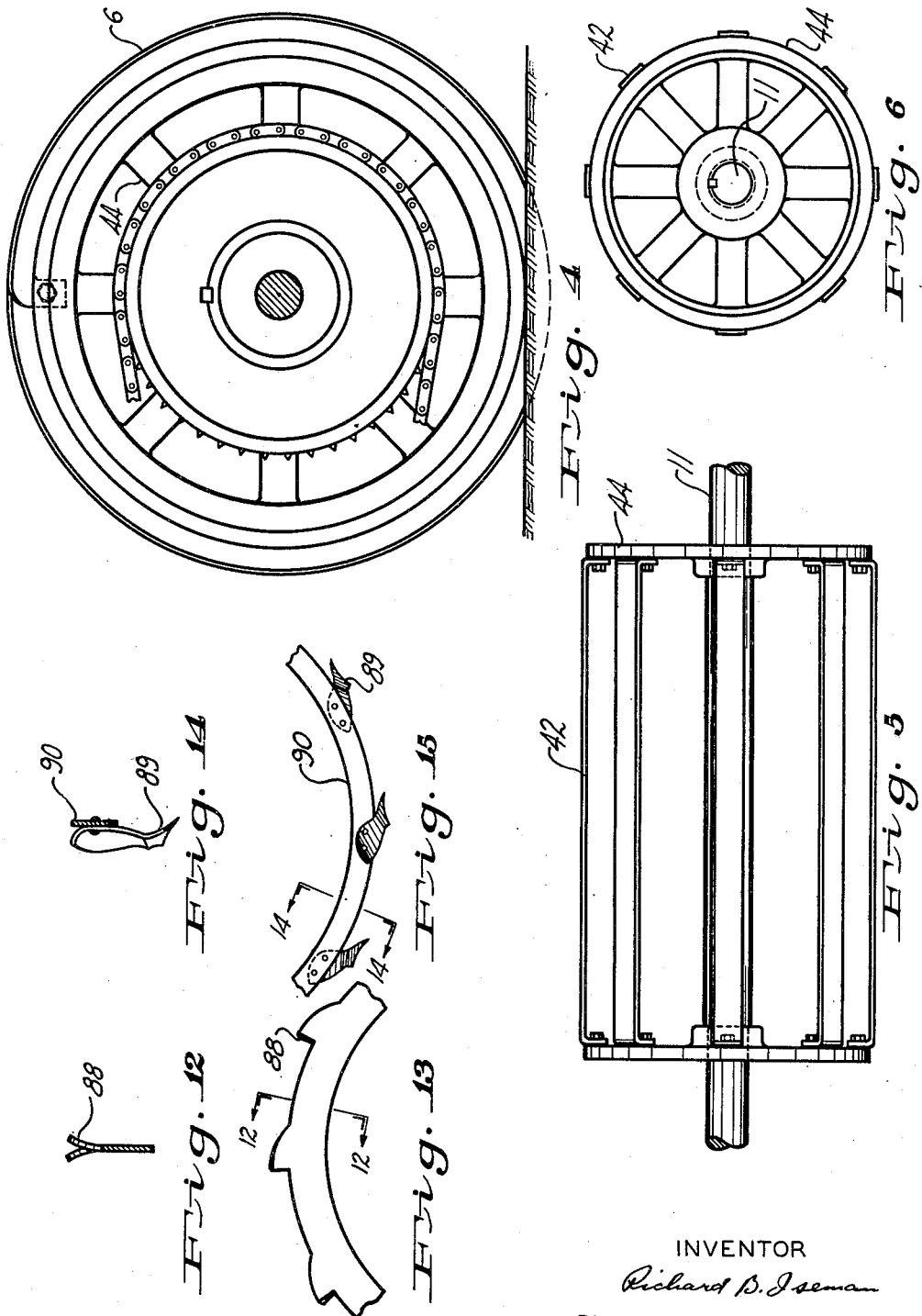

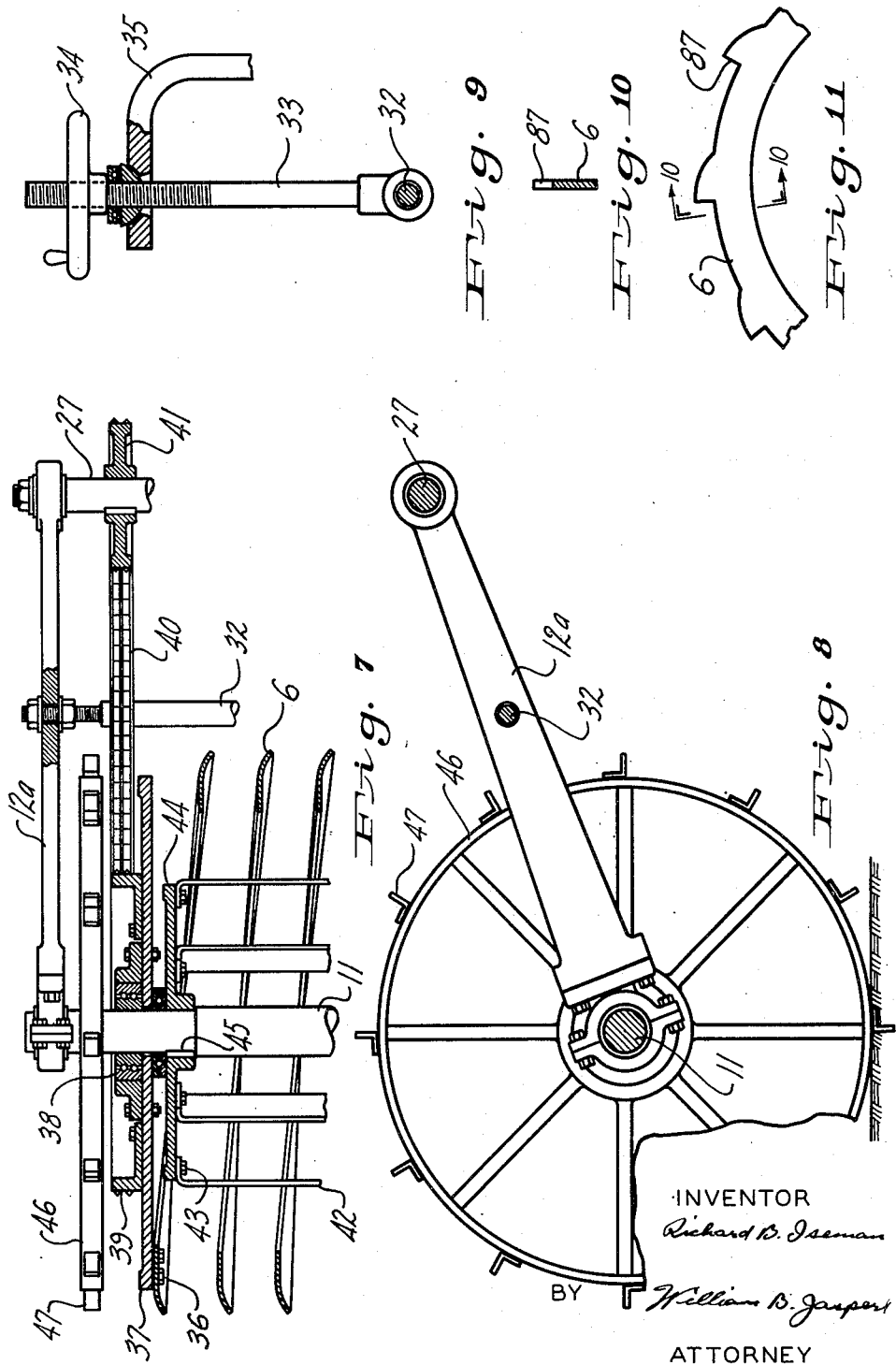

Patented July 11, 1950

2,514,395

UNITED STATES PATENT OFFICE 2,514,395

TILLING IMPLEMENT WITH CONCENTRIC HELICAL CUTTERS

Richard B. Iseman, Du Bois, Pa.

Application October 19, 1946, Serial No. 704,320

8 Claims. (Cl. 97—41)

This invention relates to a soil tillage implement, more particularly to an implement for tilling trash lands, whether it be weeds, sod, cornstalks, or other growth that is suitable as green manure for improving the soil.

It is among the objects of the invention to provide a tillage device that will eliminate the need for deep plowing and avoid all of the detrimental features incident to the use of conventional equipment which plows the fertilizer deep into the soil where it cannot function as a plant food for the growing crop.

It is a further object of the invention to provide a soil preparing machine which shall be adapted to properly prepare trash lands by inserting the sod or other growths, including cornstalks, just beneath the soil top, which affords decomposition of the green substances that are thus mulched beneath the top soil but not buried to the usual depths practiced by deep plowing.

It is a further object of the invention to provide a soil tillage device which may be attached to tractors or in itself powered as a unit trash farming implement, and which in one form shall embody a cutting member of substantially helical shape and having inside cutting members for comminuting and turning over the soil turned over by the outer cutting member, whereby cornstalks, weeds or other surface materials are cut up during the tilling operation.

It is a further object of this invention to provide a rotary tilling device in which the cutting depth is determined by the speed of rotation of the tilling member independently of speed of travel of the implement.

A further object of the invention is the provision of a soil tillage device of the above designated character which shall be of simple, compact and durable mechanical construction in which the outer tilling and inner cutting elements are separately driven in the same or opposite directions and in which the tillage implement as a whole is mounted in a manner to be adjustable to the depth of the soil to be tilled and to be movable out of place when transported from one area to another.

Figure 1:
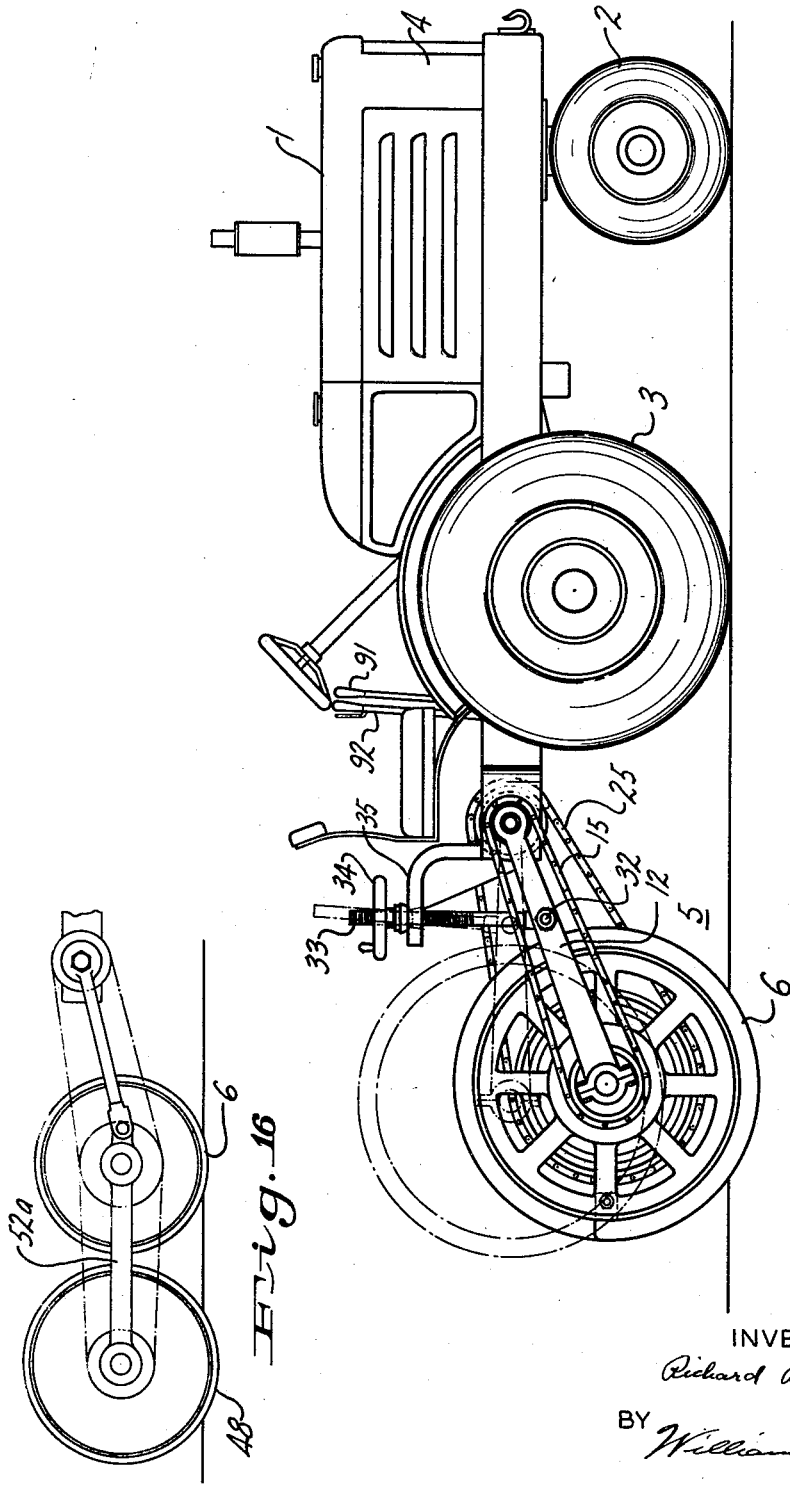
Figure 2:
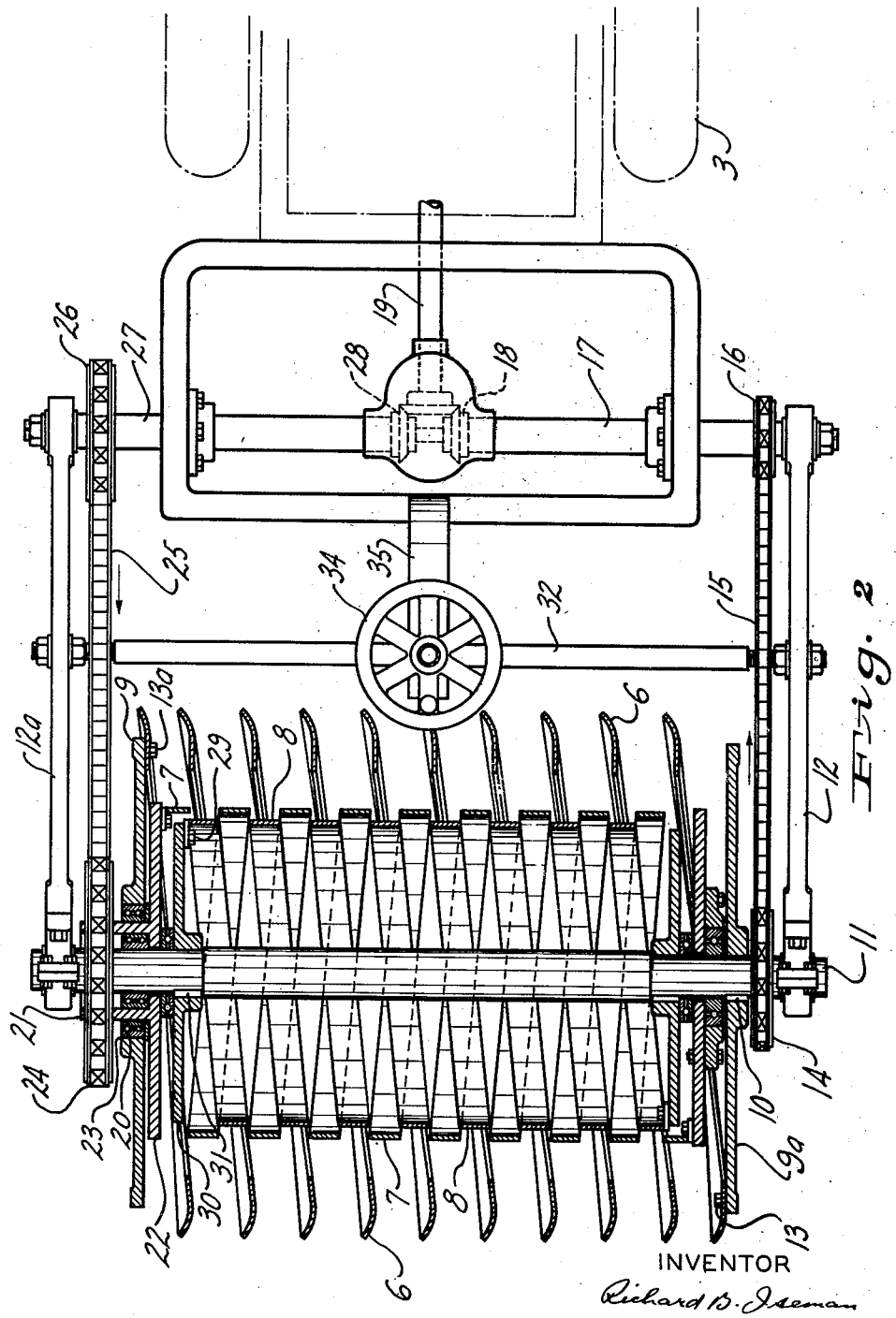
Figure 3:
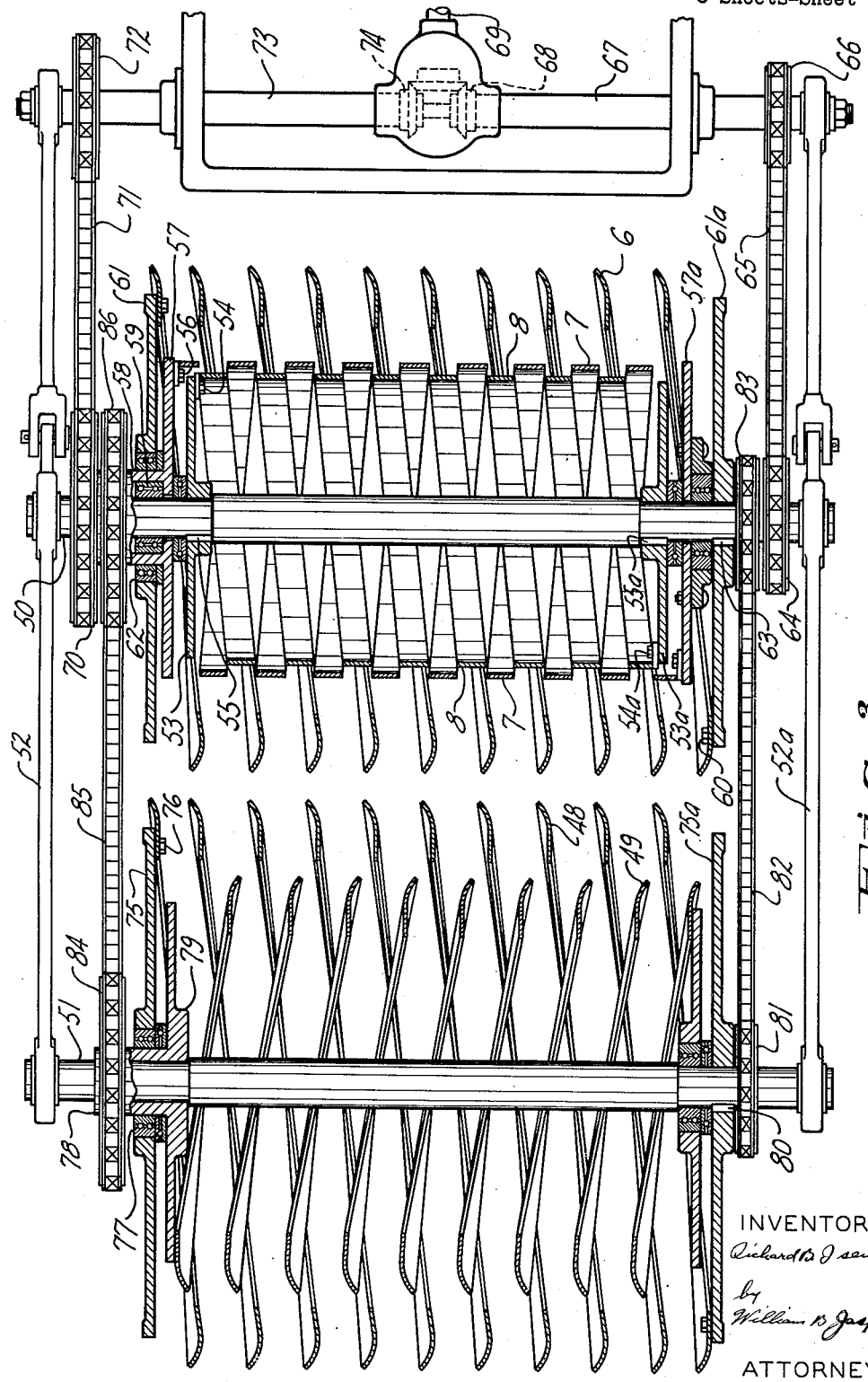

These and other objects of the invention will become more apparent from a consideration of the accompanying drawings, constituting a part hereof, in which like reference characters designate like parts, and in which Fig. 1 is a side elevational view of a trash farming implement embodying the principles of this invention;

Fig. 2 a top plan view thereof, showing but a portion of the tractor;

Fig. 3 a top plan view of a double tilling device embodying the principles of this invention;

Fig. 4 a side elevational view of a modified form of tilling implement;

Fig. 5 a front elevational view of an inner cutter member employed in the form of tillage device shown in Fig. 4;

Fig. 6 an end elevational view of the cutter of Fig. 5;

Fig. 7 a top plan view, partially in section, of a portion of the tilling device of Fig. 4;

Fig. 8 a side elevational view, partially cut away, of a traction wheel utilized in the form of tillage implement of Figs. 4 to 7;

Fig. 9 a vertical cross sectional view, partially in elevation, of an adjusting device for controlling the depth of the tilling implement shown in Figs. 1 and 2;

Fig. 10 a cross sectional view of one form of tilling blade, taken along the line 10—10, Fig. 11;

Fig. 11 a side elvational view of a portion of the tilling blade;

Fig. 12 a cross sectional view of a tooth type tilling implement, taken along the line 12—12, Fig. 13;

Fig. 13 a side elevational view of a portion of such tilling implement;

Fig. 14 a cross sectional view, partially in elevation, taken along the line 14—14 of Fig. 15 of still another modified form of tilling implement;

Fig. 15 a side elevational view thereof; and

Fig. 16 a side elevational view, diagrammatically illustrating the tandem or multiple type of tilling device shown in Fig. 3.

With reference to Fig. 1 of the drawings, numeral 1 generally designates a tractor having steering wheels 2 and traction wheels 3 on wheeled axles supporting the engine member 4, the tractor thus far described being no part of the present invention separate and apart from its use with a tillage implement generally designated by the reference character 5. The tilling device comprises an outer cutting blade 6 in the form of a helix as shown in Fig. 2, the blade 6 being wound on edge to adapt it to cut into the sod or other top surface of the land to be tilled and subject it to a turning action. Within the outer tilling blade 6 are disposed a plurality of flat wound helical cutter blades 7 and 8 which shear off the tops, such as cornstalks, weeds and the like, and which also act to comminute the top of the soil turned up by the outer tilling implement 6. As shown in Fig. 2, the outer helical blade 6 is mounted on a plurality of discs 9 and 9a, the latter being keyed at 10 to a shaft 11 which is journaled in side frames 12 and 12a, the cutter 6 being connected to the discs by bolts 13 and 13a. Shaft 11 is provided with a sprocket wheel 14 having a chain connection 15 with a drive sprocket 16 on shaft 17 which is driven through bevel gears 18 by the propeller shaft 19 connected to the tractor engine. The disc 9 is journaled in antifriction bearings 20 mounted on a hollow hub 21 of a disc 22 to which is connected the outer flat helically wound cutter blade 7. Disc 20 is journaled by antifriction bearings 23 on a connection of the shaft 11 and is driven by a sprocket wheel 24 through chain 25 and a sprocket wheel 26 that is mounted on drive shaft 27 having bevel gear connections 28 with the propeller or power shaft 19.

The inner flat helically wound cutter blade 8 is fastened by a bolt 29 to a disc 30 that is keyed at 31 to the shaft 11 to rotate therewith so that the inner cutting member 8 rotates in the same direction as the outer tilling member 6, while the cutting member 7 rotates in the direction opposite to the tilling blade 6 and inner blade 8.

The side frames 12 of the tilling device are connected by a yoke 32 which, as shown in Fig. 9, is provided with a jack screw 33 that is adjustable by a hand wheel 34 to raise and lower the tilling device relative to the tail bracket 35 of the tractor frame.

The vertical adjustment of the tilling device relative to the tractor frame is shown in dotted lines in Fig. 1 of the drawings. The dotted lines indicate the raised position and the solid lines the cutting position of the tilling member.

With reference to Figs. 4 to 8 inclusive of the drawings, a modified form of tilling and cutting mechanism consists of the outer cutting blade 6 helically wound and secured by bolts 36 to a disc 37 that is journaled by antifriction bearings 38 on shaft 11 and which carries a sprocket wheel 39 driven by chain 40 and sprocket wheel 41 mounted on the drive shaft 27. The inner cutter, instead of employing the helically wound flat strips 7 and 8, consists of blades 42 secured by bolts 43 to a disc 44 that is keyed to shaft 11 at 45 to rotate therewith, the shaft being separately driven by the sprocket wheel 14, chain 15, wheel 16 and drive shaft 17, as shown in Fig. 2 of the drawings. Thus the inner cutter rotates in the direction opposite to the outer or tilling cutter 6. The straight blades 42 of the inner cutter function to cut weeds, cornstalks, or sod that is turned over by the outer tiller 6.

A feature of the form of device shown in Fig. 7 is a traction wheel 46 having knobs 47 in the form of angles, as shown in Fig. 8, the wheels 46 being journaled on the shaft 11, as shown in Fig. 8. In this form of the device the traction wheel determines the depth of the cutting action of the tiller blade 6.

Another modification of the tilling implement is shown in Figs. 3 and 16 and consists of a front and back tilling implement arranged in tandem in which the front implement consists of the outer tilling blade 6 and the inner cutting blades 7 and 8 as shown and described in Fig. 2 of the drawings, and the rear implement consists of a tilling blade 48 and an inner blade 49 having their helix angles in opposite directions, the inner blade functioning to turn over the soil turned up by the outer blade. The front and rear implements are mounted on shafts 50 and 51 journaled in frames 52 and 52a, the inner blades 8 of the front implement being mounted on discs 53 and 53a to which they are secured by bolts 54 and 54a, the discs 53 and 53a being keyed at 55 and 55a to shaft 50 to rotate therewith. The blade 7 is secured by bolts 56 to discs 57 and 57a which have hub sleeves 58 journaled in antifriction bearings 59 mounted on the shaft 50. The outer tilling blade 6 is secured by bolts 60 to discs 61 and 61a, disc 61 being journaled by antifriction bearings 62 on the hollow hub 58 of disc 57 and disc 61a is keyed to the shaft 50 at 63 as shown in Fig. 3. Shaft 50 is driven by sprocket wheel 64, chain 65, sprocket wheel 66, connected to a drive shaft 67 which, through gears 68, is driven by a power shaft 69. This drive when actuated turns both the outer tilling blade 6 and the inner cutting blade 8. Cutting blade 7 is actuated by sprocket wheel 70, chain 71, and sprocket wheel 72 mounted on shaft 73, which, through the gears 74, is driven by power shaft 69.

The rear tilling implement has its outer blade 48 mounted on disc 75 to which it is secured by bolts 76, which disc is journaled on antifriction bearings 77 carried on the hub 78 of disc 79 to which is secured the inner blade 49. As shown, the disc 75a, to which the outer blade 48 is connected, is keyed at 80 to the shaft 51, the latter being driven by sprocket wheel 81, chain 82 and sprocket wheel 83 that rotates with shaft 50. The disc 79 carrying the inner cutting blade 59 is driven by sprocket wheel 84, chain 85 and sprocket wheel 86 that is mounted on the hollow hub 58 of the disc 53 whereby the inner blade 49 rotates in the direction opposite to the outer blade 48. As shown in Fig. 16, the rear implement may be of a larger diameter than the front to operate at a greater depth in tilling the soil.

With reference to Figs. 10 to 15 inclusive of the drawings, the outer tilling blade 6 is shown as provided with teeth 87 for shaley or pebbley soil to prevent sliding of the blade, and instead of the teeth protruding on the tilling implement 6, as shown in Figs. 10 and 11, they may be cut into the blade 6 as will appear obvious. In the form of teeth shown in Figs. 12 and 13, the teeth 88 are struck out or set, and in the type of tilling blade shown in Figs. 14 and 15, separate teeth shaped like cultivator or plow shares 89 are attached to a helically wound band or rod 90 which takes the place of the outer tilling implement 6 or the outer tilling blade 48 in the tandem form of Fig. 3.

In the operation of the above described trash farming implements, the implement may be transported by the tractor to the field to be tilled by raising the same as shown in Fig. 1 of the drawings to provide necessary ground clearance during transportation. When ready for use the tilling device is lowered by adjustment of hand wheel 34 to a desired depth for cutting, and by operating the control levers 91 and 92, Fig. 1, the power shaft 69 is actuated by the tractor engine and the tilling and cutting blades are revolved in the manner as hereinbefore described with the inner blades adjacent the outer tilling blade rotating in the direction opposite to the outer tilling blades. In the form of the device shown in Fig. 2 and the front tiller of Fig. 3, the inner cutter 8 is rotated in the same direction as the outer tiller blade but in the direction opposite to the blade 7.

The soil is thus turned over to a desired depth, the implement functioning to fold under corn stubble or weeds while cutting up the sod, and by means of the tandem type of Fig. 3 the front tiller initially cuts the soil and the inner cutters cut up the cornstalks or weeds while the rear tiller turns the soil to a greater depth if desired and folds it back by means of its inner tilling blade.

By means of the above described tilling implement the surface of farm land is cleared of trash without burying the green manure to a depth where it will not be beneficial in feeding the growing crop after the seed has germinated. Also there is less tendency for soil erosion and a lesser amount of power is required for this type of tilling implement than in the use of gang plows or the like.

Although several forms of tilling and cutting blades and arrangement of such have been illustrated and described, it will be evident to those skilled in the art that various modifications may be made in the details of construction without departing from the principles herein set forth.

I claim:

1. A tilling implement comprising an outer cutter of substantial diameter rotatably mounted, having horizontally spaced tilling blades with their tilling faces forming a continuous helix, said cutter being mounted for controlled depth engagement with the soil, power means for rotating said cutter independently of the forward movement of the cutter, a revolving cutter mounted coaxially inside of said first-named cutter, and means for actuating said inside cutter to rotate the same in the direction opposite to the direction of rotation of said outer cutter.

2. In a tilling implement, an outer cutter of substantial diameter mounted for controlled depth engagement with the soil, said cutter consisting of a continuous helical blade, the depth of the cutter blade being substantially the depth of the soil to be tilled, said cutter having the blade ends connected to a pair of spiders journaled for rotation on a shaft, an inner cutter disposed within said outer cutter mounted on said shaft and keyed thereon to be rotatable therewith, a drive mechanism for said spiders and a drive mechanism for said shaft and power means for actuating said drives in opposite directions.

3. An implement for tilling soil comprising a tractor for drawing the implement, a frame mounted on said tractor and adjustable vertically relative thereto, a cross shaft journaled with its axis horizontally disposed in said frame, an outer cutter journaled on said shaft, an inner cutter coaxially mounted to be rotatable with said shaft inside of said outer cutter, drive means for said outer cutter, drive means for said shaft, and means for actuating said drive means in opposite directions.

4. An implement for tilling soil comprising a tractor for drawing the implement, a frame mounted on said tractor, a cross shaft journaled in said frame, traction wheels journaled on said shaft, a tilling blade journaled on said shaft, a second blade within said first named blade mounted for rotation coaxially with said shaft, and independent drive means for said blades to actuate same for rotation in opposite directions, said drive means consisting of a power shaft and a pair of drive shafts geared to said power shaft for rotation in opposite directions.

5. In a soil tilling apparatus, a tilling blade in the shape of a helix having its tilling face in substantially the plane of the helix angle, a coaxially mounted inner weed cutter comprising a plurality of flat wound helical blades radially spaced from the inner edges of said tilling blade, said flat blades having their helixes disposed in opposite directions and being spaced from each other to form shearing edges for cutting weeds or the like and being spaced from the tilling blade out of contact with the soil turned over by the tilling blade, said flat wound helical blades being mounted for rotation in opposite directions.

6. In a soil tilling apparatus, a tilling cutter in the shape of a helix with its tilling face disposed in substantially the plane of the helix angle, a plurality of weed cutters coaxially mounted inside of said tilling cutter comprising flat helically wound blades radially spaced to provide contiguous shearing edges for cutting weeds or the like, a drive mechanism for actuating said tilling cutter, and a drive mechanism for actuating said weed cutter, said weed cutter blades being rotatable in opposite directions.

7. In a soil tilling apparatus, a tilling cutter in the shape of a helix having its tilling face disposed in substantially the plane of the helix angle, the ends of said cutter being mounted on discs, a drive shaft for one of said discs, a weed cutter consisting of a plurality of flat blades helically wound in opposite directions secured to discs coaxially mounted with said tilling cutter and drive shaft, one of which is rotatable with the disc of said tilling cutter and the other being independently rotatable, drive means for said shaft and for one of said cutter disc and means for varying the vertical height of said drive shaft to regulate the depth of the tilling action of the cutter.

8. In a soil tilling apparatus, a rotary tilling implement mounted for movement over the soil and adapted to rest thereon, said implement comprising an endless helical blade mounted for rotation independently of the locomotion of the apparatus, a weed cutter coaxially mounted for rotation inside of said tilling blade, drive means for impelling said apparatus over the soil and drive means for actuating said helical tilling blade to rotate at speeds independently of the speed of forward movement of the tilling apparatus, and drive means for actuating said weed cutter to rotate in the direction opposite the direction of rotation of said tilling blade.

RICHARD B. ISEMAN.

REFERENCES CITED

The following references are of record in the file of this patent:

UNITED STATES PATENTS

| Number | Name | Date |
| --- | --- | --- |
| 936,712 | Griffin | Oct. 12, 1909 |
| 1,301,443 | Ike | Apr. 22, 1919 |

FOREIGN PATENTS

| Number | Country | Date |
| --- | --- | --- |
| 381,504 | Great Britain | Oct. 6, 1932 |